United States Patent [19]
Keller

[11] Patent Number: 5,455,635
[45] Date of Patent: Oct. 3, 1995

[54] KINESCOPE DRIVER WITH GAMMA CORRECTION AND BRIGHTNESS DEPENDENT CAPACITOR COUPLING

[75] Inventor: Anton W. Keller, Zurich, Switzerland

[73] Assignee: RCA Thomson Licensing Corporation, Princeton, N.J.

[21] Appl. No.: 234,025

[22] Filed: Apr. 28, 1994

[51] Int. Cl.[6] .................................................. H04N 5/202
[52] U.S. Cl. ............................................ 348/674; 348/687
[58] Field of Search .................................... 348/674, 254, 348/687, 686, 678, 805, 806, 808; 358/164, 32; 315/383; H04N 5/202, 5/20, 9/69, 5/208

[56] References Cited

U.S. PATENT DOCUMENTS

| | | | |
|---|---|---|---|
| 2,921,131 | 1/1960 | Bonner et al. | 348/674 |
| 3,633,121 | 1/1972 | Bretl | 348/674 |
| 4,096,517 | 6/1978 | Hinn | 358/40 |
| 4,126,814 | 11/1978 | Marlowe | 315/307 |
| 4,858,015 | 8/1989 | Furrey | 358/242 |
| 5,083,198 | 1/1992 | Haferl et al. | 358/32 |
| 5,317,240 | 5/1994 | Keller | 315/383 |

FOREIGN PATENT DOCUMENTS

| | | | |
|---|---|---|---|
| 174580 | 9/1985 | Japan | 358/164 |

Primary Examiner—James J. Groody
Assistant Examiner—Chris Grant
Attorney, Agent, or Firm—Joseph S. Tripoli; Peter M. Emanuel; Richard G. Coalter

[57] ABSTRACT

A video input signal is amplified and applied to the cathode of a kinescope via linear kinescope driver amplifier provided with an output impedance sufficiently high to impart gamma correction to images displayed by the kinescope but tending to diminish the bandwidth of the amplified video signal applied to the cathode. A capacitor is included in the driver for restoring the bandwidth of the amplified video signal. For stabilizing the high frequency response (detail) of displayed images the value of the capacitor is varied as a function of the brightness of displayed images.

10 Claims, 6 Drawing Sheets

KINESCOPE DRIVER WITH GAMMA CORRECTION AND BRIGHTNESS DEPENDENT CAPACITOR COUPLING

FIELD OF THE INVENTION

This invention relates to television systems generally and particularly to kinescope cathode driver apparatus with provisions or providing gamma correction.

BACKGROUND OF THE INVENTION

Figure 1:
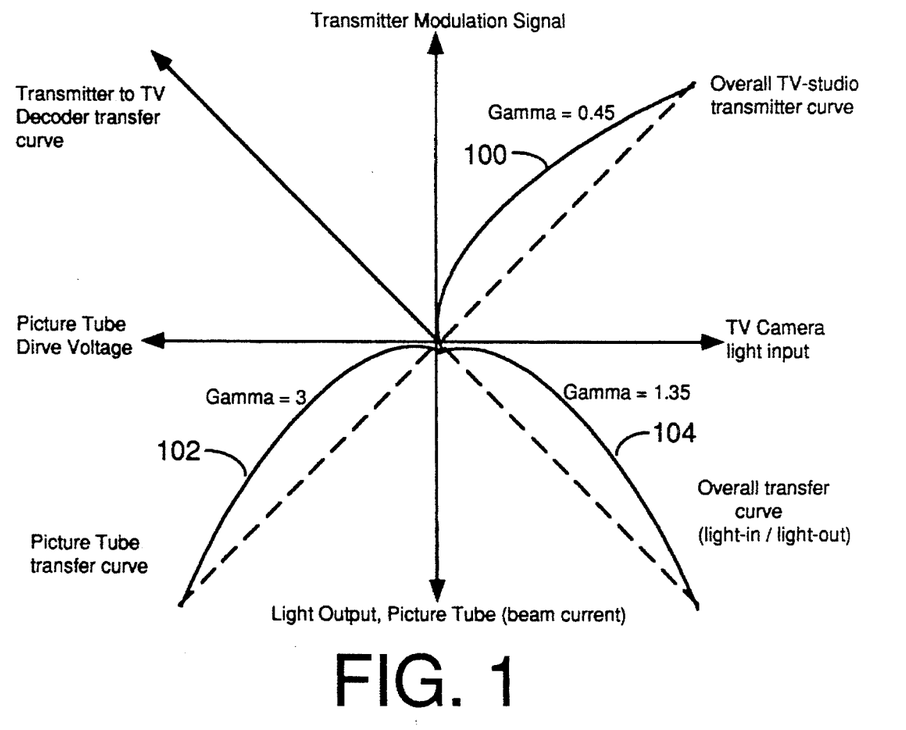
FIG. 1 is a diagram showing exemplary transfer characteristics and gamma values for a television transmitter, a television receiver and the overall television system including the transmitter and receiver.

In an ideal television system the light output produced by a kinescope would be linearly related to the light applied to a camera pick-up tube. In practical systems, neither the camera tube or the display tube are linear devices. In other words, the signal voltage produced by a camera tube is not linearly related to the light that is detected and the light produced by a kinescope is not linearly related to the cathode drive voltage applied to it. The relationship between light input and signal output for the camera tube, and the relationships between signal input and light output of the picture tube, are both commonly expressed by the term "gamma" which, simply stated, is the exponent or "power" to which an input function (X) is raised to produce an output function (Y). If, for example, an input function X is raised to the first power (gamma=1) to produce an output function, then the two functions are said to be linearly related. If the output varies as the square of the input function, the value of the exponent (gamma) is equal to "2". If the output varies as the square root of the input function, the "gamma" or exponent equals 0.5. Gamma, in other words, is simply a measure of curvature of a transfer function, FIG. 1 shows the gamma of various aspects of a video signal transmission system, with curve 100 representing the transfer characteristic of the transmission side, curve 102 representing the transfer characteristic of the picture tube (kinescope or "CRT"), and curve 104 representing the overall transfer characteristic. The transmitted video signals of the NTSC, PAL and SECAM television standards have a gamma of about 0.45 to 0.5 while the picture tube (kinescope) of color television receivers have a gamma of about 2.8 to 3.1. As a result, the overall transfer curve (light into the camera to light output from the picture tube) is not linear and the overall gamma is, in practice about 1.35 instead of a unity (1.0) gamma. This implies that the exponential transfer characteristic of the picture tube is not fully compensated, leading to compression of dark picture portions of the display. Such compression causes picture details near black to be lost, and colored areas to fade to black. Concurrently, whites are excessively amplified with respect to the dark portions to the point of often reaching picture tube saturation and blooming.

Figure 2A:
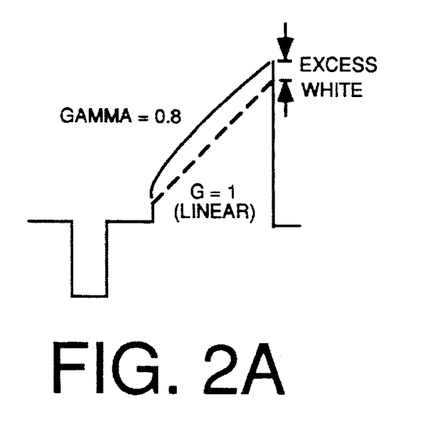
FIGS. 2A and 2B are diagrams illustrating gamma correction.
Figure 2B:
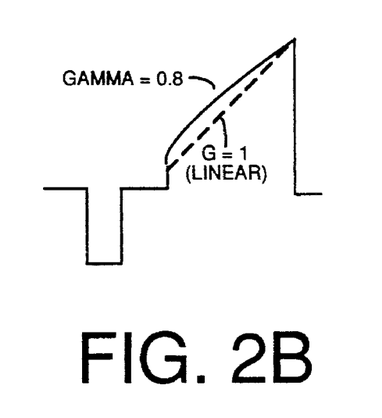

A linear overall transfer characteristic avoids the problem of black compression and can be obtained by an additional gamma correction of about 0.8 in each of the red, green, and blue (R, G and B) signal processing circuits in the television receiver. However, picture tubes have a relatively small dynamic range of light output which can not be enlarged without reaching picture tube saturation causing blooming. Therefore, gamma correction to increase amplification of dark image areas can cause a signal compression of the high signal whites. This is illustrated in FIG. 2A showing a partially gamma corrected ramp signal in which the gain for signals near black level is increased. It is desirable, however, that peak white be kept at the same level as in the uncorrected case, the dashed line, to avoid picture tube blooming. For this to occur, the slope of the upper portion of the ramp signal may be reduced as shown in FIG. 2B. This corrects the black compression problem while avoiding the problem of "blooming" (excessive whites).

Reducing the upper portion of the ramp signal to avoid blooming, however, can create another problem. The viewer perceives the reduced signal as a lack of contrast in gray to white picture areas resulting in "washed out" appearing pictures. In such an event, the improvement of contrast of low-brightness portions of the image by gamma correction is obtained at the expense of high brightness contrast deterioration.

There are, generally speaking, two conventional approaches to gamma correction. One approach is to apply non-linear processing to the video signal in the driver circuitry as exemplified, for example, by Haferl et al. in U.S. Pat. No. 5,083,198 which issued Jan. 21, 1992. In an embodiment of the Haferl et al. apparatus, a video signal is divided into low and high amplitude portions, the latter are high pass filtered and then the original video signal, the low amplitude portion and the high pass filtered high amplitude portion are combined for application to a kinescope. Images displayed include gamma correction for black to gray picture areas and boosted detail for gray to white picture areas.

The other approach to gamma correction is to apply linear processing to the video signal and rely upon the non-linear impedance characteristics of the kinescope cathode for gamma correction as exemplified, for example, by Furrey in U.S. Pat. No. 4,858,015 which issued Aug. 15, 1989. In an embodiment of the Furrey apparatus a video signal is linearly amplified and applied to a voltage follower the output of which is coupled to the kinescope cathode via a parallel connection of a resistor and a capacitor. The resistor, in combination with the non-linear resistive portion of the cathode impedance, provides gamma correction as will be explained in detail later. However, the resistor, in combination with the stray capacitance of the cathode, creates a frequency response pole at a relatively low frequency (i.e., it acts as a low pass filter). This tends to reduce the high frequency detail of displayed images. The inclusion of a by-pass capacitor tends to reduce the low pass filtering effect and improves the high frequency response.

SUMMARY OF THE INVENTION

In the two approaches to gamma correction described above, the non-linear processing approach provides relatively low impedance drive for the kinescope thus reducing the filtering effect of the stray capacitances associated with the cathode and so providing relatively uniform and stable high frequency response. On the other hand, the non-linear processing approach is relatively complex.

The linear processing approach has the virtue of simplicity, economy and improved reliability (due to requiring fewer circuit elements). However, it has been found that, even with a by-pass capacitor, the high frequency response is unstable and tends to vary with the luminance signal level. The reason for this undesirable variation is due to what will here-in-after be called "brightness dependent pole shifting" caused, as discussed in detail later, by variations in the real (resistive) component of the kinescope dynamic impedance with changes in beam current. The visual effect is manifested as a variation of high frequency (detail) in displayed images with variations in the scene brightness.

The present invention resides, in part, in recognizing that a need exists for a gamma corrected kinescope driver amplifier having the advantages of the relatively stable high frequency response characteristic of systems employing non-linear processing while having the relative simplicity characteristic of systems employing linear processing. The present invention is directed to meeting those needs.

Kinescope driver apparatus, in accordance with the invention, includes a linear amplifier for receiving a video input signal and for applying an amplified video signal to the cathode electrode of a kinescope. The linear amplifier is provided with an output impedance sufficiently high to impart gamma correction to images displayed by the kinescope but tending to diminish the bandwidth of the amplified video signal applied to the cathode. A capacitor is included in the driver for restoring the bandwidth of the amplified video signal. Additionally, circuit means are provided for varying the value of the capacitor as a function of the brightness of displayed images.

Advantageously, varying the value of the capacitor as a function of the brightness of displayed images minimizes the undesirable effect of "brightness dependent pole shifting" discussed above and so provides displayed images with relatively stable high frequency (detail) characteristics.

A method of providing gamma correction to a kinescope, in accordance with the invention, comprises the steps of (i) linearly amplifying a video input signal for application to the cathode of a kinescope; (ii) providing the amplifier with a resistive component of output impedance sufficiently high to impart gamma correction to images displayed by the kinescope but tending to diminish the bandwidth of the amplified signal coupled to the cathode electrode; (iii) coupling a capacitor to a circuit point in the amplifier for restoring the bandwidth of the amplified video signal delivered to the cathode electrode and (iv) varying the value of the capacitor as a function of the brightness of displayed images.

The latter feature of the method of the invention provides the advantage of stabilizing the bandwidth of the amplifier for variations in picture brightness level.

Kinescope driver apparatus, in accordance with the invention, is suitable for use with amplifiers of a type having an "active load" element thus providing a relatively low output impedance and, with certain modifications, may also be used with amplifiers of a type having a "passive load" element thus providing a relatively high output impedance.

BRIEF DESCRIPTION OF THE DRAWING

The foregoing and further features of the invention are illustrated in the accompanying drawing wherein like elements are denoted by like reference designators and in which.

DETAILED DESCRIPTION

Figure 3:
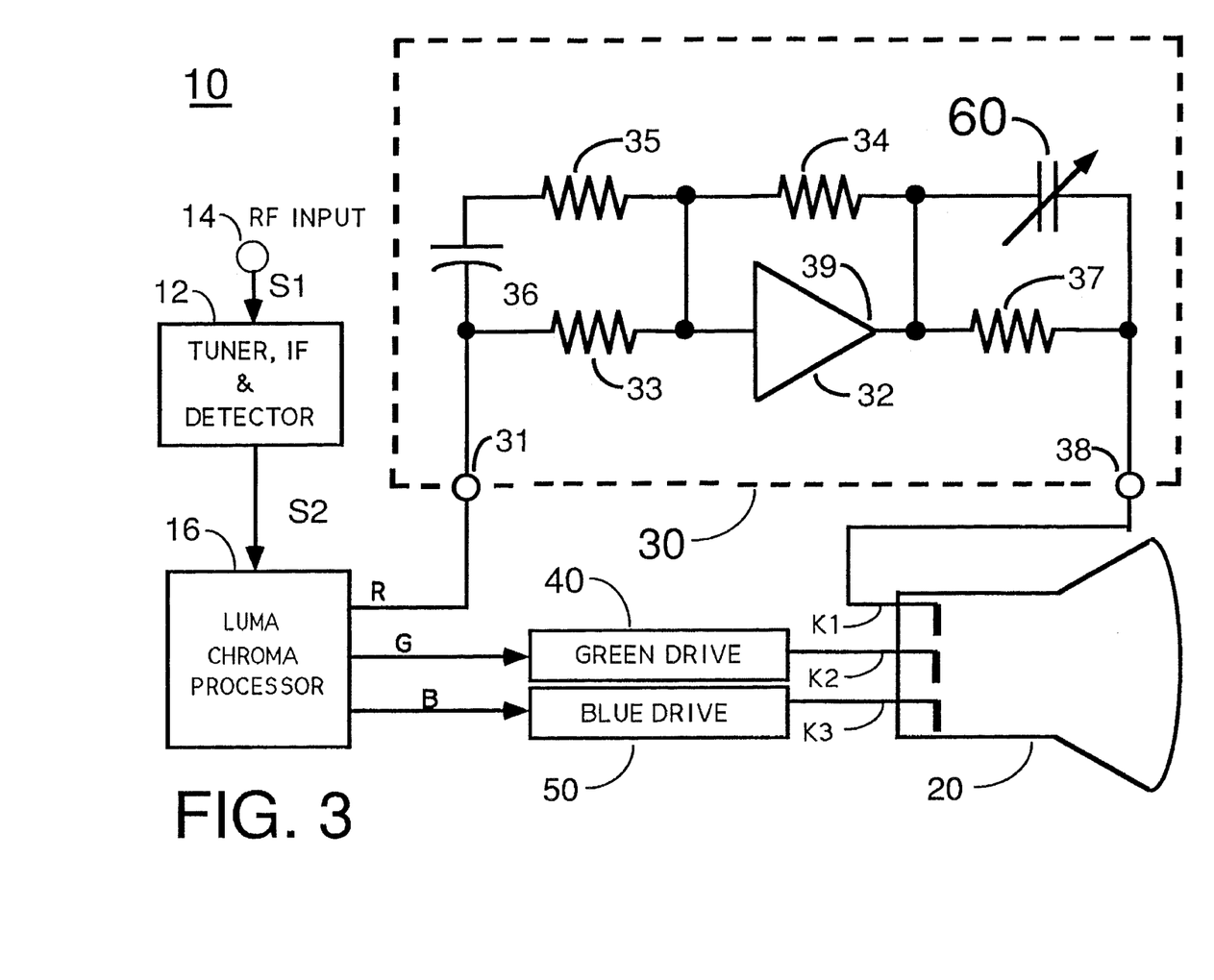
FIG. 3 is a simplified block diagram of a television receiver with a kinescope driver amplifier embodying the invention.

The television receiver 10 of FIG. 3 includes a tuner, intermediate frequency amplifier (IF) and detector unit 12 having an RF input terminal 14 for receiving an RF input signal S1 from a suitable source (e.g., broadcast, cable, VCR or the like) and provides a base band video output signal S2 to a chrominance/luminance signal processing unit 16 that provides component red (R), green (G) and blue (B) video output signals for display by a kinescope 20. To provide high voltage drive signals to the cathodes K1, K2 and K3 of kinescope 20, the R, G and B drive signals are applied to respective ones of the cathodes via respective kinescope driver amplifiers 30, 40 and 50. The driver amplifiers are identical and so only the details of one (driver 30) are illustrated.

Driver 30 includes an input terminal 31 for receiving the video input signal (the Red component in this case) and a (inverting) linear amplifier 32. The gain of the amplifier is determined by the ratio of an input resistor 33 and a feedback resistor 34. High frequency boost is provided by a series connection of a resistor 35 and capacitor 36 in parallel with the input resistor 33. Illustratively, the boost components may be selected to provide increased high frequency response at the upper end of the luminance signal band (e.g., in the region of 4 MHz) to compensate for the loss of detail in the gray to white region resulting from the gamma correction applied in the black to gray region.

Since the feedback loop for amplifier 32 is closed, the output impedance of the amplifier is very low and so the output is essentially a voltage source having a voltage proportional to the value of the input signal, R. To provide gamma correction, the resistive component of the amplifier output impedance is increased to a value between the maximum and minimum values of the resistive component of the dynamic impedance of the cathode of kinescope 20. This increase in impedance is provided by resistor 37 which couples the output 39 of amplifier 32 to output terminal 38 of the driver amplifier 30 which is further coupled to the cathode K1 of the kinescope 20. The value of the series resistor 37 determines the resistive component of the output impedance of the kinescope driver amplifier 30.

Figure 5A:
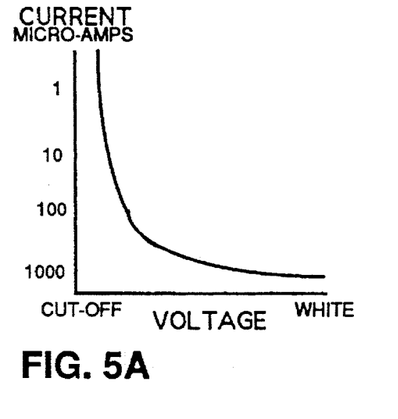
FIGS. 5A–5D are response diagrams illustrating the operation of the kinescope driver amplifiers of FIGS. 3 and 4.
Figure 5B:
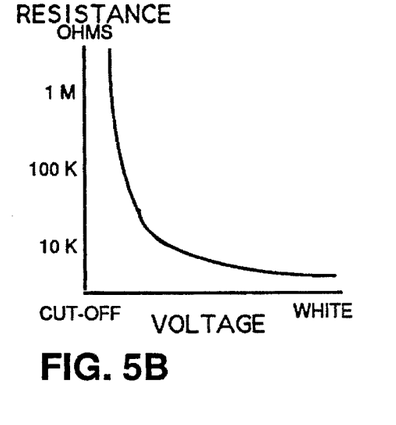

The value of resistor 37 is selected to be sufficiently high to impart gamma correction to images displayed by the kinescope 20. For this purpose, resistor 37 is selected to have a value between the maximum and minimum values of dynamic resistance presented by the cathode K1 of kinescope 20. The maximum dynamic resistance of the cathode occurs when the cathode is driven to cut-off potential to produce a black level image. The minimum value of the resistance of cathode K1 occurs when the cathode is driven to produce a peak white output image on kinescope 20. FIG. 5A illustrates the non-linear relationship of cathode current Vs voltage for a kinescope and FIG. 5B shows this non-linear effect in terms of the change in the real component (resistance) of the cathode impedance as a function of cathode voltage. (It will be noted that the imaginary component of the cathode impedance comprises a fixed value stray capacitance which does not change with cathode drive.) As shown, the resistance decreases as the beam current increases being a maximum value at the beam current cut-off level and a minimum value at the peak white level.

Gamma correction is produced by choosing a value for the output resistive component of output impedance of driver amplifier 30 that lies between the minimum and maximum values of the dynamic resistive components of the cathode impedance of kinescope 20. For a value in this range, the driver amplifier essentially acts as a voltage source when the cathode impedance is relatively high (black level signals) and so provides a relative boost in beam current to increase the contrast in black to gray image areas. Conversely, the driver amplifier acts as a current source when the cathode impedance is relatively low (white level signals). The increased impedance at this level provides a relative decrease in beam current thus tending to provide a compression of the contras of displayed images. The compression is compensated by boosting the high frequency (detail) of relatively bright image areas as discussed later.

The series resistor 37 that provides gamma correction in the example of FIG. 3 in combination with the stray capacitance associated with cathode K1 forms a first-order low-pass filter having a pole or "corner" frequency determined by the value of the stray capacitance, the value of resistor 37 and the resistive component of the dynamic impedance of the cathode K1 of kinescope 20. Typically, the pole location or "corner frequency" of the filter is quite low, a few hundred kilo-Hertz or so. Since the resistive component of the dynamic impedance of the cathode varies with changes in the cathode drive level, the pole location also changes and so the bandwidth of the overall display system (driver and associated kinescope) will tend to change with variations in brightness level.

The foregoing problem results because the real component (resistance) of the dynamic cathode impedance varies with cathode current and the imaginary component (capacitance) does not.

The solution is to provide a capacitor 60 which is coupled to a point in the driver amplifier 30 for restoring the bandwidth of the amplified video signal and to vary the capacitance of the capacitor 60 as a function of the brightness of displayed images.

More specifically, in the example of FIG. 3, the value of capacitor 60 is varied inversely with changes in the brightness level of displayed images. Illustratively, as the driver level approaches white level the capacitance is reduced. Conversely, for signals approaching black level the capacitance is increased. These changes tend to stabilize the overall bandwidth of the display system (driver 30 and kinescope 20) as the brightness level changes.

The foregoing effects are further illustrated by the following analysis. For purposes of discussion, the cathode resistance will be denoted as Rk and the stray capacitance associated with the cathode will be denoted Cs. If the cathode resistance Rk were constant, then the response of the coupling circuit would be frequency independent for the following resistance and capacitance relationships:

$$R37/Rk = Cs/C60 \quad (1)$$

However, the cathode resistance Rk is not constant. Rather it behaves as a voltage dependent resistor as shown in FIG. 5B. As seen, the resistance is over 100 k-Ohms near cut-off and drops to less than 10 k-Ohms near peak white. Taking this variation into account, equation (1) may be revised to the following:

$$R37/Rk_{(Vc)} = Cs/C60_{(Vc)} \quad (2)$$

The subscripts "Vc" indicate that the cathode resistive component Rk and the value of the by-pass capacitor 60 are both functions of a common variable control voltage Vc. From this, the value of capacitor C60 may be found from:

$$C60_{(Vc)} = (Cs)(Rk_{(Vc)})/R37 \quad (3)$$

In this manner capacitor C60 becomes dependent on the same voltage Vc as the cathode resistance and so the bandwidth is stabilized for variations in the cathode resistance (kinescope drive level). Since the current through resistor 37 (cathode current) is a measure of Vc (see FIG. 5A) this current is used to control the value of capacitor 60. There are various ways in which this might be done. One may, for example, sense the kinescope cathode voltage (or current) to generate a suitable control signal Vc and apply the control signal to either a voltage dependent capacitor or to the control input of variable frequency high pass filter.

Figure 4:
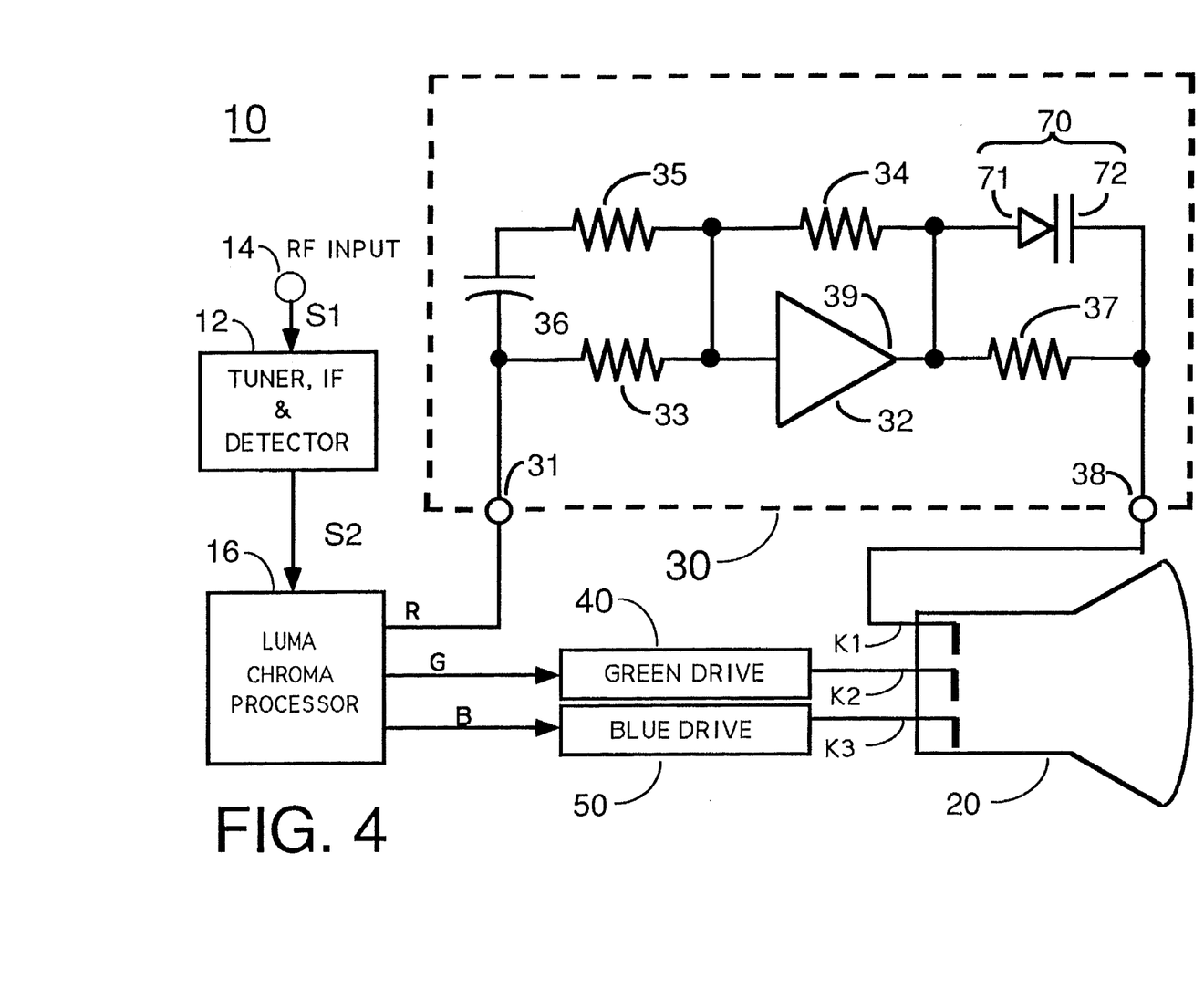
FIG. 4 illustrates a modification of the receiver of FIG. 3.

The example of FIG. 4 illustrates a presently preferred means of capacitor control in which capacitor 60 is implemented as a varactor or "varicap" diode coupled in parallel with resistor 37. The diode is poled with its anode 71 connected to output 36 of amplifier 32 and its cathode 72 connected to the cathode K1 of kinescope 20. The non-linearity of the diode should be selected to approximate the non-linearity of the cathode resistance over the desired cathode drive current range.

In operation, as the kinescope drive current increases for lighter scenes, the voltage across resistor 37 increases providing a bias voltage that decreases the capacitance value of diode 70. Conversely, for darker scenes the cathode current is lower, the voltage across resistor R37 is lower and the capacitance value is increased. These changes are in a sense to stabilize the pole location discussed above thereby providing a more uniform bandwidth for the overall display system 20, 30, 40, and 50.

A further parameter of interest in the examples described above is what is herein termed the driver amplifier "gain-ratio", R. This function controls the amount of gamma correction imparted to the video signal. The gain-ratio R equals the maximum-gain divided by the minimum gain and may be calculated with the aid of the following equation:

$$R_{[dB]} = 20 \times \log (1/(1 + S_{max} \times R37)) \quad (4)$$

In equation (4) the parameter "$S_{max}$"=$\Delta Ic/\Delta Vc$, represents the transconductance of the kinescope cathode near white level. This information is available in picture tube data sheets for a specific tube. A typical value of transconductance is about 50 micro-Amps per Volt.

Figure 5C:
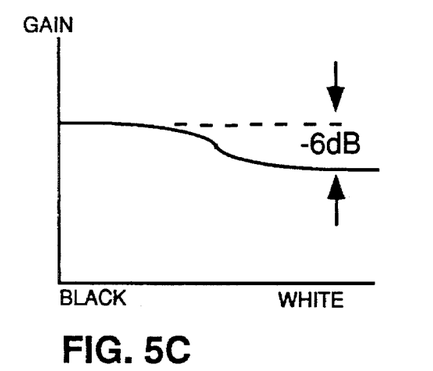
Figure 5D:
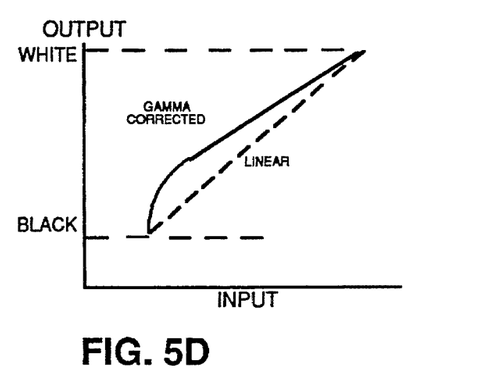

The gain-ratio factor R is illustrated in FIG. 5C for a 6 dB change from black level to peak white. The reduction of 6 dB going from black to white expands contrast in the black to gray areas and compresses it in the gray to white areas as shown in FIG. 5D. The reduction in contrast at higher drive levels is compensated for by the improved detail provided by resistor 35 and capacitor 36 which, as previously noted, provide high frequency peaking in the high end of the luminance signal band (e.g., about 4 MHz).

Figure 6:
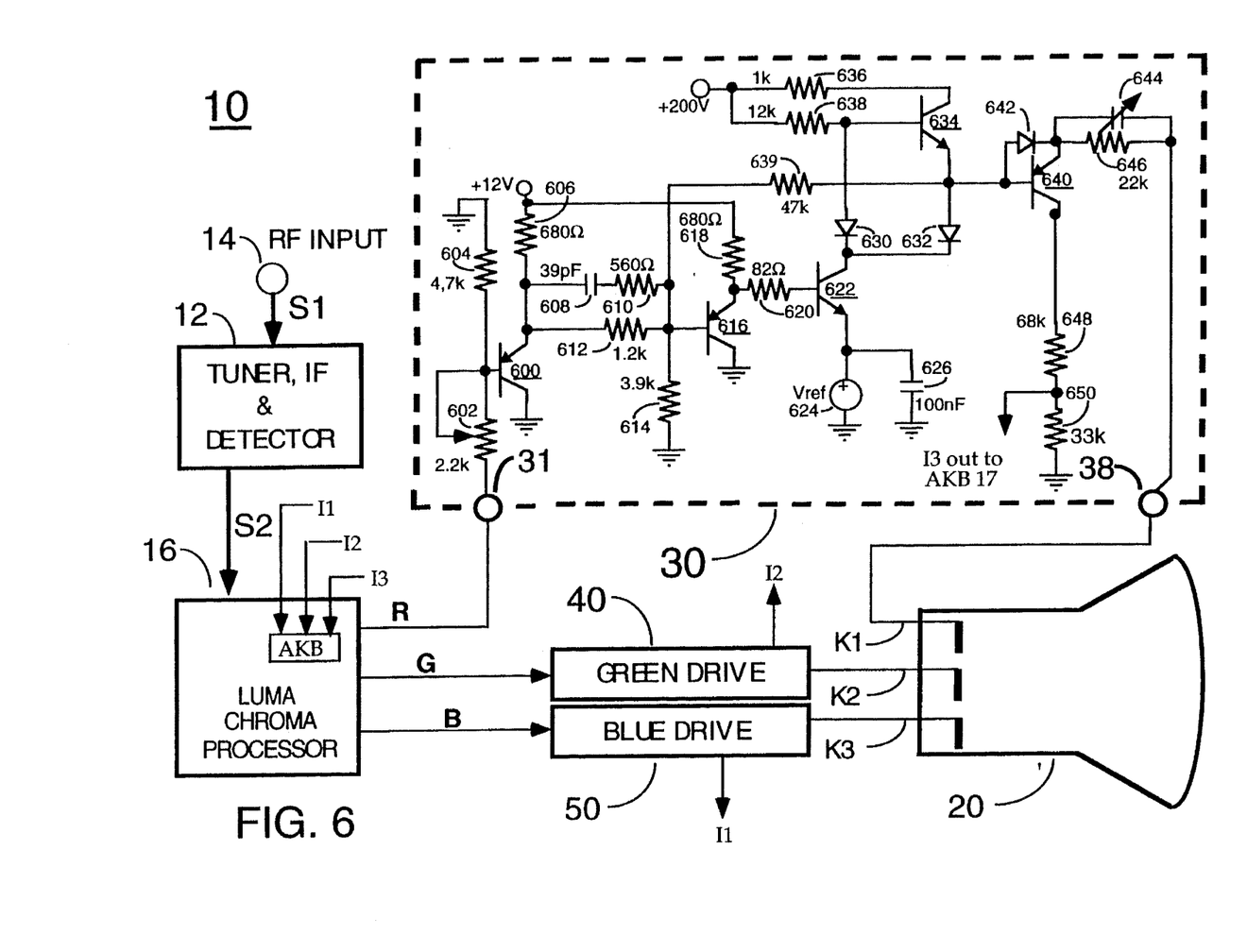
FIGS. 6 and 7 are detailed schematic diagrams of kinescope driver amplifiers embodying the invention.

FIG. 6 provides a detailed circuit example of driver 30 together with provisions for automatic kinescope bias (AKB) control. For this purpose the luminance and chrominance signal processor 16 is provided with an AKB control unit 17 which receives samples of the cathode currents I1, I2 and I3 of cathodes K1, K2 and K3 provided by the kinescope driver amplifiers 30, 40 and 50.

In driver amplifier 30 PNP transistor 600 operates as an emitter follower with resistor 606 serving as the emitter load resistor and an attenuator including potentiometer 602 and resistor 604 providing adjustment of the input signal level to transistor 600. Transistors 616 and 622 amplify the signal provided by the emitter follower providing output current to an active load impedance comprising transistor 634 and resistors 636 and 638. The gain is stabilized by negative feedback provided resistor 639 to the base of transistor 616.

The overall gain is determined by the ratio of the feedback resistor 639 and the source impedance for transistor 616 of the input coupling network comprising resistors 612 and 614 (a DC coupling) and a high frequency by pass network (resistor 610 in series with capacitor 608) in parallel with the input resistor 612. This network gives a high frequency boost at the upper end of the lumiance band to compensate for improved picture detail. The output of the active load (emitter of transistor 634) is coupled by a AKB current sensing circuit (including emitter follower transistor 640 having a by-pass diode 642 across its base emitter junction) and the parallel combination of a variable capacitor 644 and a fixed resistor 646 to the output terminal 38. A kinescope arc protection resistor may be added to this path. The capacitor 644 and resistor 646 function as previously described to provide gamma correction for images displayed by kinescope 20 along with compensation for the low frequency pole formed by resistor 646 and the stray capacitance of kinescope 20. A nominanl capacitance value for the capacitor 644 is on the order of about 22 pico-Farads. The collector current provided by the AKB sensing transistor 640 is applied to an attenuator comprising resistors 648 and 650 the output of which (the current I3) is applied to the AKB circuit 17 in luminance chrominance processor 16.

Figure 7:
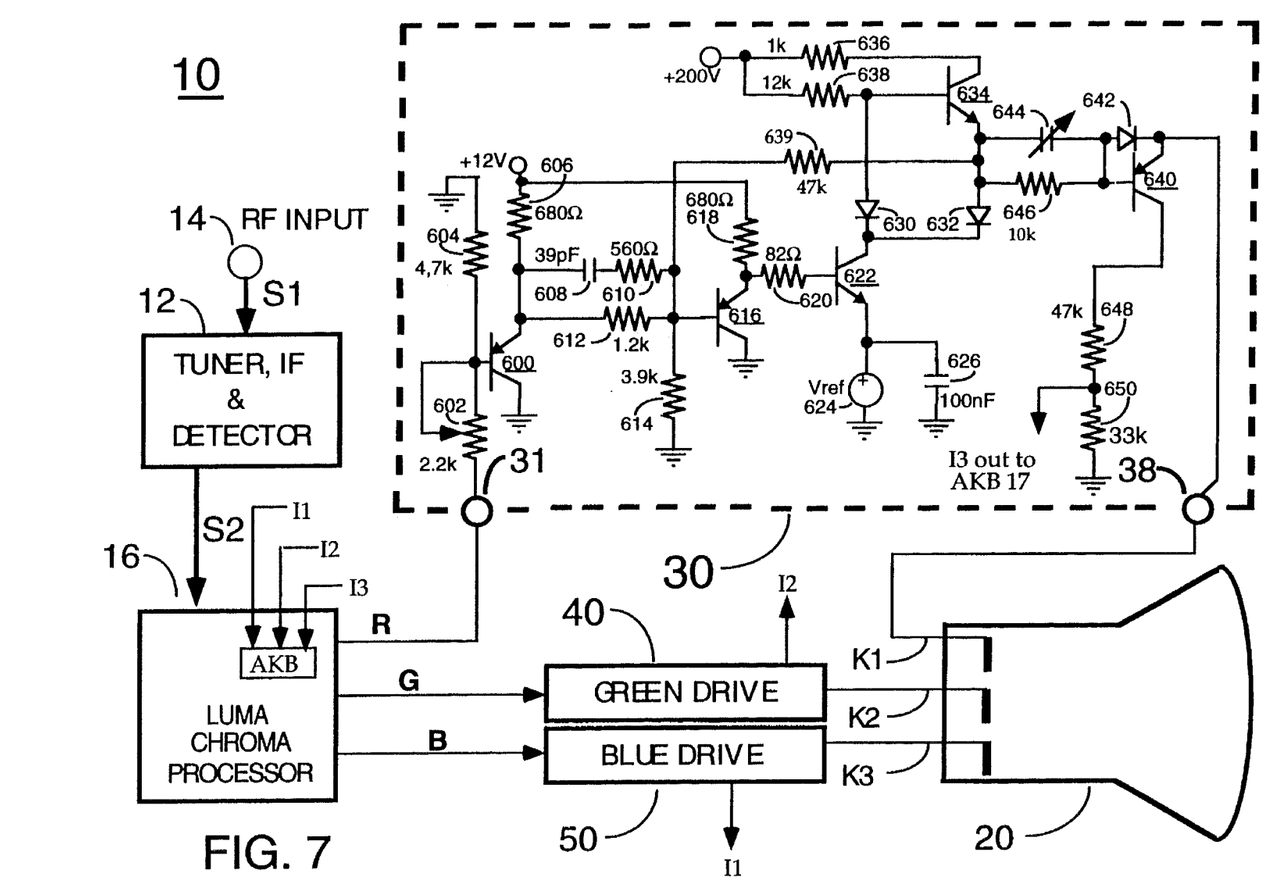

FIG. 7 illustrates a modification of FIG. 6 in which the the gamma correction elements 644 and 646 are placed before the AKB sensing transistor 640. Exemplary circuit values are indicated for this configuration. Since the value of resistor 646 is lower than in the previous example, the nominal capacitance value should be proportionately increased. The circuit operation is otherwise the same as previously described. There has been shown and described a kinescope driver system which provides gamma correction without need for non-linear circuit elements in the driver, in which white compression is counteracted and in which frequency response poles are stabilized against variations in beam current by variation of white compression compensation capacitance to provide an overall kinescope drive system exhibiting improved detail for low-light scenes, preserved detail for high-light scenes and stable overall frequency response.

What is claimed is:

1. Kinescope driver apparatus, comprising:
   a linear amplifier for receiving a video input signal and applying an amplified video signal to a cathode of a kinescope;
   said linear amplifier having an output resistor with a resistance value sufficiently high to impart gamma correction to images displayed by said kinescope but tending to diminish the bandwidth of said amplified video signal applied to said cathode; and
   a capacitor, coupled to an output of said amplifier, for restoring said bandwidth of said amplified video signal: and
   circuit means for varying the capacitance of said capacitor as a function of the brightness of displayed images.

2. Apparatus as recited in claim 1 wherein said circuit means varies said capacitance in inversely with the brightness of said displayed images.

3. Apparatus as recited in claim 1 wherein said capacitance of said capacitor is varied as a function of the kinescope cathode voltage.

4. Apparatus as recited in claim 1 wherein said capacitor is coupled in parallel with said resistor and comprises a voltage dependent capacitor.

5. Apparatus as recited in claim 1 wherein said linear amplifier has the output coupled to said cathode via a further amplifier connected in series with said capacitor.

6. Apparatus as recited in claim 1 wherein said linear amplifier has the output coupled to said cathode via a further amplifier connected in series with said capacitor and said capacitor comprises a voltage dependent capacitor.

7. Apparatus as recited in claim 1 wherein said capacitor is of a type having a voltage dependent capacitance and wherein said means for varying the value of said capacitance comprises means coupling said capacitor between the output of said amplifier and said cathode.

8. A method for providing gamma correction in a kinescope driver apparatus, comprising:
   (i) linearly amplifying a video input signal in an amplifier for application to a cathode of a kinescope;
   (ii) providing the amplifier with a resistive component of output impedance sufficiently high to impart gamma correction to images displayed by the kinescope but tending to diminish the bandwidth of the amplified signal coupled to the cathode electrode;
   (iii) coupling a capacitor to an output of the amplifier for restoring the bandwidth of the amplified video signal delivered to the cathode electrode; and
   (iv) varying the value of the capacitor as a function of the brightness of displayed images.

9. A method as recited in claim 8 wherein the value of said capacitor is varied inversely with said brightness of said displayed images.

10. A method as recited in claim 8 wherein the step of providing the amplifier with said resistive component includes coupling the output of the amplifier to said cathode electrode via a resistor and the step of coupling the capacitor comprises connecting the capacitor in parallel with said resistor.

* * * * *